(12) United States Patent
Chirca et al.

(10) Patent No.: US 11,403,110 B2
(45) Date of Patent: Aug. 2, 2022

(54) STORING A RESULT OF A FIRST INSTRUCTION OF AN EXECUTE PACKET IN A HOLDING REGISTER PRIOR TO COMPLETION OF A SECOND INSTRUCTION OF THE EXECUTE PACKET

(71) Applicant: TEXAS INSTRUMENTS INCORPORATED, Dallas, TX (US)

(72) Inventors: Kai Chirca, Dallas, TX (US); Timothy D. Anderson, University Park, TX (US); Paul Daniel Gauvreau, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/079,105

(22) Filed: Oct. 23, 2020

(65) Prior Publication Data
US 2021/0124589 A1  Apr. 29, 2021

Related U.S. Application Data

(60) Provisional application No. 62/924,794, filed on Oct. 23, 2019.

(51) Int. Cl.
*G06F 9/38* (2018.01)
*G06F 9/30* (2018.01)
(Continued)

(52) U.S. Cl.
CPC ........ *G06F 9/3867* (2013.01); *G06F 9/30101* (2013.01); *G06F 9/30116* (2013.01); *G06F 9/3853* (2013.01); *G06F 9/3857* (2013.01); *G06F 9/3861* (2013.01); *G06F 9/3863* (2013.01); *G06F 9/4812* (2013.01); *G06F 9/4843* (2013.01); *G06F 9/542* (2013.01); *G06F 9/544* (2013.01); *G06F 11/368* (2013.01); *G06F 11/3696* (2013.01)

(58) Field of Classification Search
CPC ..... G06F 9/00–3897; G06F 15/00–825; G06F 9/3853; G06F 9/30116; G06F 9/3863; G06F 9/3861; G06F 9/3865; G06F 9/3857; G06F 9/30101; G06F 9/3867; G06F 9/3859
See application file for complete search history.

(56) References Cited

U.S. PATENT DOCUMENTS

5,075,844 A * 12/1991 Jardine ................ G06F 9/3861
712/218
5,222,240 A * 6/1993 Patel ................... G06F 9/30141
712/218
(Continued)

*Primary Examiner* — Keith E Vicary
(74) *Attorney, Agent, or Firm* — Brian D. Graham; Charles A. Brill; Frank D. Cimino (57) ABSTRACT

A method includes receiving an execute packet that includes a first instruction and a second instruction and executing the first instruction and the second instruction using a pipeline. Executing the first and second instructions includes storing a result of the first instruction in a holding register; determining whether an event that interrupts execution of the execute packet occurs prior to completion of the executing of the second instruction; and based on the event not occurring, committing the result of the first instruction after completion of the executing of the second instruction.

14 Claims, 8 Drawing Sheets

(51) Int. Cl.
    *G06F 9/54*       (2006.01)
    *G06F 11/36*    (2006.01)
    *G06F 9/48*       (2006.01)

(56) References Cited

U.S. PATENT DOCUMENTS

| | | | | |
|---|---|---|---|---|
| 5,838,988 A * | 11/1998 | Panwar | G06F 9/3861 | 712/32 |
| 6,085,312 A * | 7/2000 | Abdallah | G06F 9/3861 | 712/208 |
| 6,131,157 A * | 10/2000 | Wang | G06F 9/3836 | 712/218 |
| 6,405,300 B1 * | 6/2002 | Tremblay | G06F 9/3861 | 712/24 |
| 6,820,190 B1 * | 11/2004 | Knebel | G06F 9/30036 | 712/215 |
| 7,539,845 B1 * | 5/2009 | Wentzlaff | G06F 15/8007 | 712/10 |
| 2002/0029328 A1 * | 3/2002 | Nguyen | G06F 9/30167 | 712/23 |
| 2006/0020757 A1 * | 1/2006 | Chaudhry | G06F 9/3834 | 711/122 |
| 2015/0019840 A1 * | 1/2015 | Anderson | G06F 9/30036 | 712/206 |

* cited by examiner

STORING A RESULT OF A FIRST INSTRUCTION OF AN EXECUTE PACKET IN A HOLDING REGISTER PRIOR TO COMPLETION OF A SECOND INSTRUCTION OF THE EXECUTE PACKET

CROSS-REFERENCE TO RELATED APPLICATIONS

The present application claims priority to U.S. Provisional Patent Application No. 62/924,794, which was filed Oct. 23, 2019, is titled "DSP Architecture," and is hereby incorporated herein by reference in its entirety.

BACKGROUND

Exceptions and interrupts refer to events that occur outside the normal flow of execution of one or more instructions by a processor core and have a potential to disrupt the executing instructions. Exceptions include events, often unexpected, that are generated within the processor. Interrupts include events, also often unexpected, that are generated outside of the processor.

SUMMARY

In accordance with at least one example of the disclosure, a method includes receiving an execute packet that includes a first instruction and a second instruction and executing the first instruction and the second instruction using a pipeline. Executing the first and second instructions includes storing a result of the first instruction in a holding register; determining whether an event that interrupts execution of the execute packet occurs prior to completion of the executing of the second instruction; and based on the event not occurring, committing the result of the first instruction after completion of the executing of the second instruction.

In accordance with another example of the disclosure, a method includes receiving an execute packet of a task in a first execute stage of a pipeline (E1). The execute packet comprises a first instruction that generates a result in E1. The method also includes determining, by an event controller, whether an event is detected in the execute packet in E1; responsive to an event not being detected in the execute packet in E1, forwarding, by a pipeline controller, the execute packet to a second execute stage of a pipeline (E2) and storing the result of the first instruction in a holding register; responsive to a stall condition being present in E2, freezing the execute packet in E2 and continuing to store the result of the first instruction in the holding register; responsive to the stall condition clearing or no stall condition being present in E2, determining, by the pipeline controller, whether an event is detected associated with the execute packet in E2; and responsive to an event not being detected associated with the execute packet in E2, completing execution of the execute packet and committing the result of the first instruction in the holding register.

In accordance with yet another example of the disclosure, a data processor includes a pipeline including a first execute stage (E1), a second execute stage (E2), and a holding register. The pipeline is configured to receive an execute packet of a task in E1, and the execute packet comprises a first instruction that generates a result in E1. The data processor also includes an event controller coupled to the pipeline. The event controller is configured to determine whether an event is detected in the execute packet in E1. The data processor also includes a pipeline controller coupled to the event controller and the pipeline. The pipeline controller is configured to: responsive to an event not being detected in the execute packet in E1, forward the execute packet to E2 and store the result of the first instruction in the holding register; responsive to a stall condition being present in E2, freeze the execute packet in E2 and continue to store the result of the first instruction in the holding register responsive to the stall condition clearing or no stall condition being present in E2, determine whether an event is detected associated with the execute packet in E2; and responsive to an event not being detected associated with the execute packet in E2, complete execution of the execute packet and commit the result of the first instruction in the holding register.

BRIEF DESCRIPTION OF THE DRAWINGS

For a detailed description of various examples, reference will now be made to the accompanying drawings in which.

DETAILED DESCRIPTION

A data processor core may be configured to execute a task or process that includes a plurality of execute packets. An execute packet includes a plurality of instructions that are executed by the data processor core in parallel. The data processor core is configured to execute instructions in a pipelined fashion, where the pipeline includes an execute phase having multiple execute stages. Certain instructions complete in relatively few execute stages (e.g., in the first execute stage), while other instructions take a greater number of execute stages to complete.

In some cases, an exception or event may be generated in response to execution of an instruction. However, the exception or event is generated in an execute stage after which another instruction has already completed and thus had its result committed (e.g., written to a destination register file). In these cases, the task or process cannot be recovered to the execute packet that generated the exception or event, because of the possibility that certain instructions of that execute packet have already been committed. As a result, the task or process is restarted or ended because it cannot be recovered to the execute packet that generated the exception or event.

Examples of this disclosure address the foregoing by providing a pipeline controller that is configured to perform various functionality related to processing instructions through the pipeline. Additionally, holding registers are provided (e.g., in the execute phase of the pipeline) to hold results of instructions that complete prior to an execute stage in the pipeline in which an event may be detected. Responsive to an event or exception being detected prior to such execute stage, the pipeline controller is configured to flush the execute packet (including any results from instructions that are in the holding register) from the pipeline.

At this point, no instructions of the execute packet have been committed because the results from instructions completing prior to the event detection have also been flushed from the holding registers. Subsequently, a context switch to an event controller may be performed and the event controller is configured to handle the event or exception. Upon the event or exception being handled by the event controller, another context switch back to the task may be performed. Because none of the instructions of the flushed execute packet were committed, execution of the task is able to resume on the execute packet that was flushed from the pipeline prior to handling the event.

Figure 1:
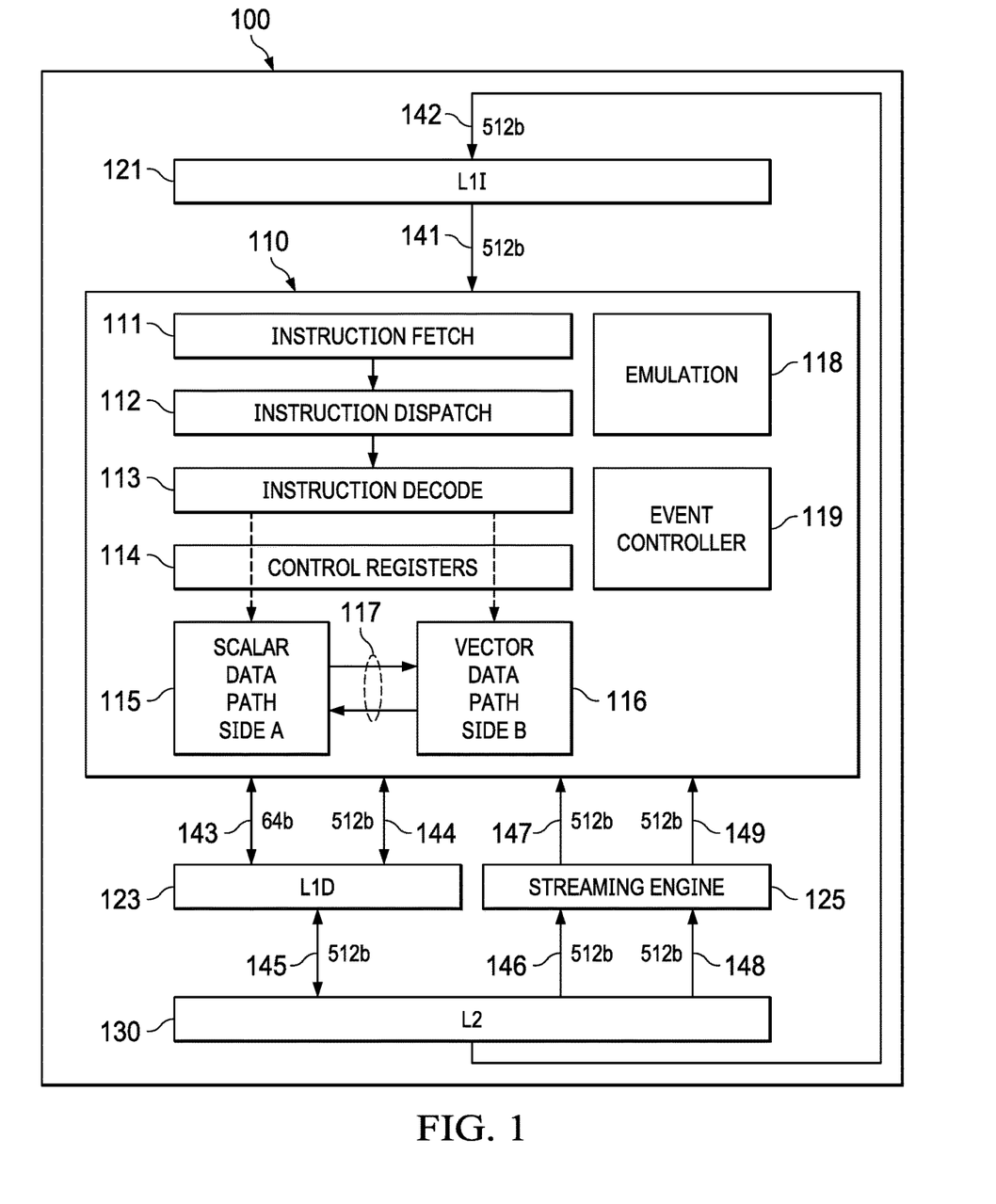
FIG. 1 is a block diagram of a dual scalar/vector datapath processor in accordance with various examples.

FIG. 1 is a block diagram a dual scalar/vector datapath processor 100 in accordance with an example of this description. Processor 100 includes separate level one instruction cache (L1I) 121 and level one data cache (L1D) 123. Processor 100 includes a level two combined instruction/data cache (L2) 130 that holds both instructions and data. FIG. 1 shows a connection between level one instruction cache 121 and level two combined instruction/data cache 130 (bus 142). FIG. 1 also shows connection between level one data cache 123 and level two combined instruction/data cache 130 (bus 145). In an example, processor 100 level two combined instruction/data cache 130 stores both instructions to back up level one instruction cache 121 and data to back up level one data cache 123. In this example, level two combined instruction/data cache 130 is further connected to higher level cache and/or main memory. In this example, central processing unit core 110 (alternately, a central processing unit 110 or a processor core 110), level one instruction cache 121, level one data cache 123 and level two combined instruction/data cache 130 are formed on a single integrated circuit. This integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. In some cases, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In this example, the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache or from main memory. In some cases, the requested instruction is simultaneously supplied to both level one instruction cache 121 and central processing unit core 110 to speed use.

In an example, central processing unit core 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating on plural instructions in corresponding functional units simultaneously. Preferably a compiler organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example, instruction dispatch unit 112 is configured to operate on plural instructions in parallel. The number of such parallel instructions is set by the size of the execute packet, as explained further below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As explained further below, in some examples, instructions include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability may be employed for algorithmic development. Event controller 119 is a unit that enables central processing unit core 110 to be responsive to external, asynchronous events (interrupts) and to respond to attempts to perform improper operations (exceptions).

Central processing unit core 110 includes streaming engine 125. Streaming engine 125 of this example supplies two data streams from predetermined addresses typically cached in level two combined cache 130 to register files of vector datapath side B 116. This provides controlled data movement from memory (as cached in level two combined cache 130) directly to functional unit operand inputs. This is further detailed below.

FIG. 1 includes exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are shown as bidirectional supporting both central processing unit 110 data reads and data writes. Level one data cache 123 exchanges data with level two combined cache 130 via bus 145. Bus 145 is preferably a 512-bit bus. Bus 145 is shown as bidirectional supporting cache service for both central processing unit 110 data reads and data writes.

In some cases, CPU data requests are directly fetched from level one data cache 123 upon a cache hit (if the requested data is stored in level one data cache 123). Upon a cache miss (the specified data is not stored in level one data cache 123), this data is sought in level two combined cache 130. The memory locations of this requested data is either a hit in level two combined cache 130 or a miss. A hit is serviced from level two combined cache 130. A miss is serviced from another level of cache or from main memory. In some cases, the requested instruction is simultaneously supplied to both level one data cache 123 and central processing unit core 110 to speed use.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are shown as unidirectional from level two combined cache 130 to streaming engine 125 and to vector datapath side B 116 in accordance with various examples of this description.

Streaming engine 125 data requests are directly fetched from level two combined cache 130 upon a cache hit (if the requested data is stored in level two combined cache 130). Upon a cache miss (the specified data is not stored in level two combined cache 130), this data is sought from another level of cache or from main memory. It is technically feasible in some examples for level one data cache 123 to cache data not stored in level two combined cache 130. If such operation is supported, then upon a streaming engine 125 data request that is a miss in level two combined cache 130, level two combined cache 130 should snoop level one data cache 123 for the stream engine 125 requested data. If level one data cache 123 stores this data, its snoop response would include the data, which is then supplied to service the streaming engine 125 request. If level one data cache 123 does not store this data, its snoop response would indicate this and level two combined cache 130 must service this streaming engine 125 request from another level of cache or from main memory.

In an example, both the level one data cache 123 and the level two combined cache 130 may be configured as selected amounts of cache or directly addressable memory in accordance with U.S. Pat. No. 6,606,686 entitled UNIFIED MEMORY System Architecture Including Cache and Directly Addressable Static Random Access Memory.

Figure 2:
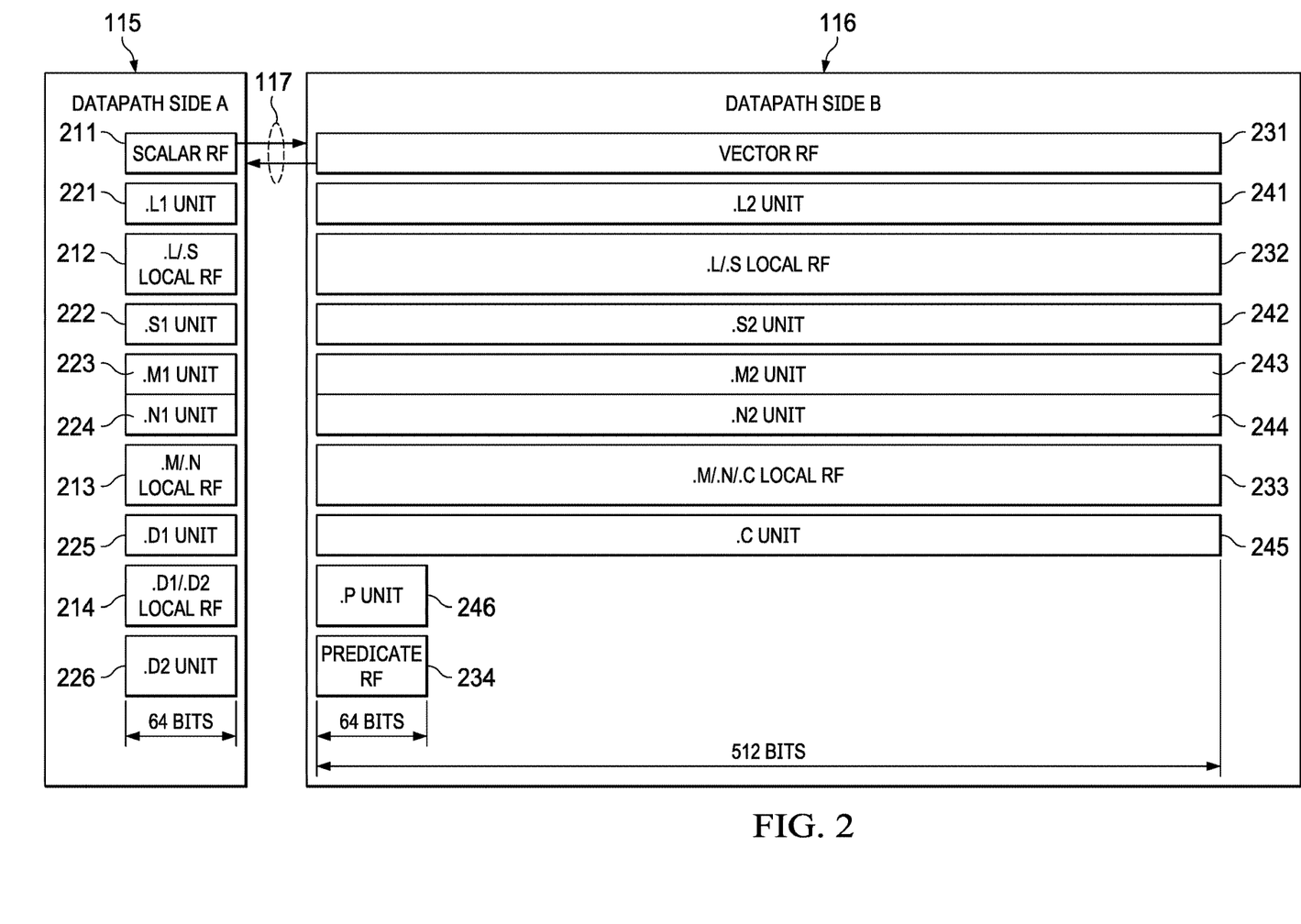
FIG. 2 is a block diagram of registers and functional units in the dual scalar/vector datapath processor illustrated in FIG. 1 and in accordance with various examples.

FIG. 2 is a block diagram that includes further details of functional units and register files within scalar datapath side A 115 and vector datapath side B 116. Scalar datapath side A 115 includes scalar register file 211 (e.g., a global scalar register file 211), .L/.S local register file 212 (e.g., a L1/S1 local register file 212), .M/.N local register file 213 (e.g., M1/N1 local register file 213) and D1/D2 local register file 214. Scalar datapath side A 115 includes L1 unit 221, S1 unit 222, M1 unit 223, N1 unit 224, D1 unit 225 and D2 unit 226. Vector datapath side B 116 includes vector register file 231 (e.g., a global vector register file 231), .L/.S local register file 232 (e.g., a L2/S2 local register file 232), .M/.N C local register file 233 (e.g., a M2/N2/C local register file 233) and predicate register file 234. Vector datapath side B 116 includes L2 unit 241, S2 unit 242, M2 unit 243, N2 unit 244, C unit 245 and P unit 246. There are limitations upon which functional units are permitted to read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. In some examples, the result is written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally are variations between the data processing operations supported by L1 unit 221 and S1 unit 222. For example, the result can be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There are certain double operations (called dual issued instructions) that employ both the M1 unit 223 and the N1 unit 224 together. In these cases, the result is written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result is written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instructions similar to L1 unit 221 except on wider 512-bit data. The result is written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222. The result is written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result is written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There are certain double operations (called dual issued instructions) that employ both M2 unit 243 and the N2 unit 244 together. The result is written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies VQ complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of predicate register file 234. P unit 246 has direct access to read from and write to predicate register file 234. These operations include single register unary operations such as: NEG (negate) which inverts each bit of the single register; BITCNT (bit count) which returns a count of the number of bits in the single register having a predetermined digital state (1 or 0); RMBD (right most bit detect) which returns a number of bit positions from the least significant bit position (right most) to a first bit position having a predetermined digital state (1 or 0); DECIMATE which selects every instruction specified Nth (1, 2, 4, etc.) bit to output; and EXPAND which replicates each bit an instruction specified N times (2, 4, etc.). These operations include two register binary operations such as: AND a bitwise AND of data of the two registers; NAND a bitwise AND and negate of data of the two registers; OR a bitwise OR of data of the two registers; NOR a bitwise OR and negate of data of the two registers; and XOR exclusive OR of data of the two registers. These operations include transfer of data from a predicate register of predicate register file 234 to another specified predicate register or to a specified data register in global vector register file 231. A commonly expected use of P unit 246 includes manipulation of the SIMD vector comparison results for use in control of a further SIMD vector operation. The BITCNT instruction may be used to count the number of 1's in a predicate register to determine the number of valid data elements from a predicate register.

Still referring to FIG. 2, crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) is configured to read a 64-bit operand from global vector register file 231. This 64-bit operand is the least significant bits of the 512-bit data in the accessed register of global vector register file 231. Plural scalar datapath side A 115 functional units are configured to employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) is configured to read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units are configured to employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have a fixed sequence of elements. Thus, programs cannot seek randomly within the stream. The stream data is read-only while active. Programs cannot write to a stream while simultaneously reading from it. Once a stream is opened, the streaming engine 125: calculates the address; fetches the defined data type from level two unified cache (in some cases, including cache service from a higher level memory); performs data type manipulation such as zero extension, sign extension, data element sorting/swapping such as matrix transposition; and delivers the data directly to the programmed data register file within CPU 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

CPU 110 operates on an instruction pipeline. Instructions are fetched in instruction packets of fixed length further described below. All instructions require the same number of pipeline phases for fetch and decode, but require a varying number of execute phases.

Figure 3:
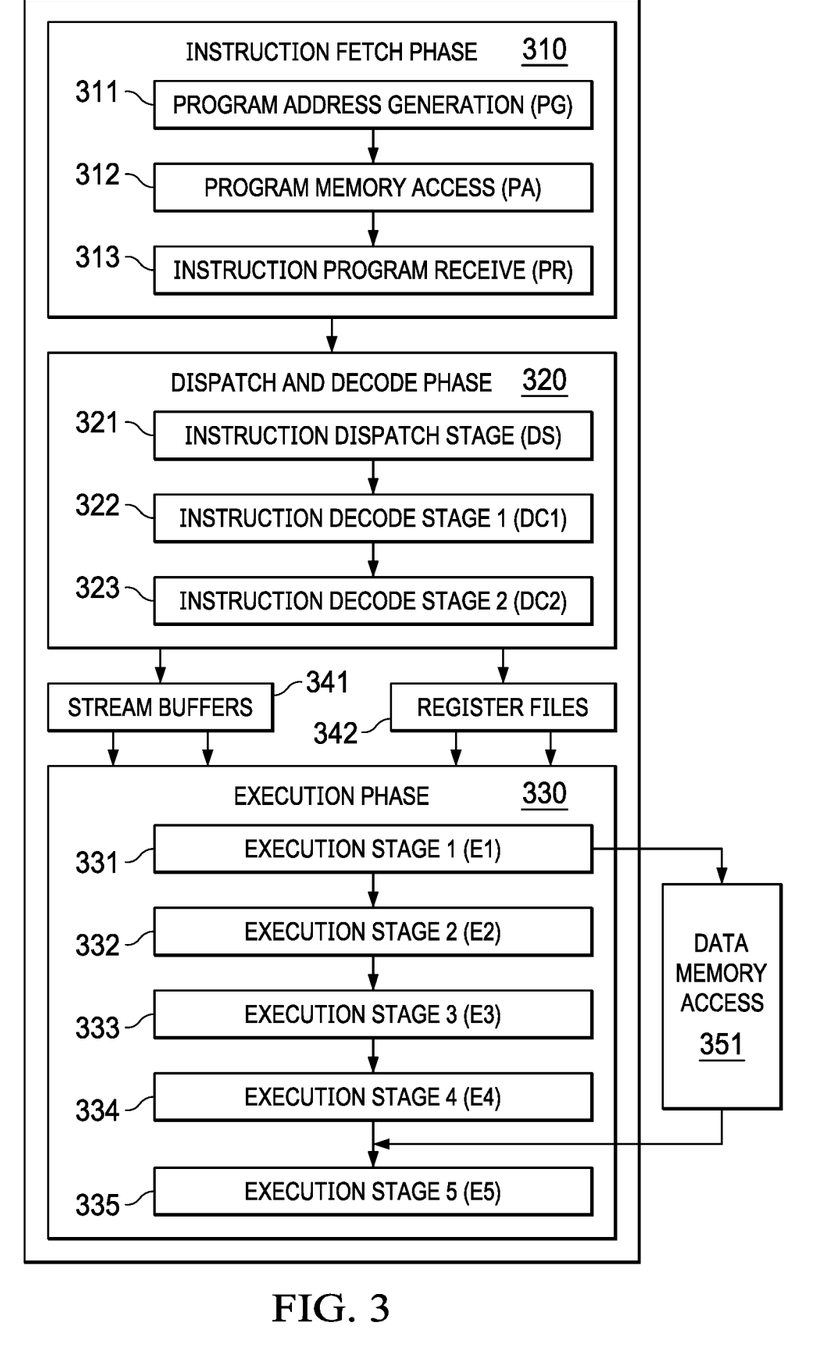
FIG. 3 is a block diagram of pipeline phases of the central processing unit in accordance with various examples.

FIG. 3 is a block diagram that shows the following pipeline phases: instruction fetch phase 310 (e.g., program fetch phase 310), dispatch and decode phase(s) 320 and execution phase(s) 330. Program fetch phase 310 includes three stages for all instructions. Dispatch and decode phases 320 include three stages for all instructions. Execution phase 330 includes one to five stages dependent on the instruction. In accordance with examples of this description, a pipeline controller, described in further detail below, is configured to perform various functionality related to processing instructions through the pipeline of FIG. 3. In particular, the pipeline controller is configured to facilitate event handling in the execution phase 330 of the pipeline.

Fetch phase 310 includes program address generation stage 311 (PG), program memory access stage 312 (PA) (e.g., program access stage 312 (PA)) and instruction program receive stage 313 (PR) (e.g., program receive stage 313 (PR)). During program address generation stage 311 (PG), the program address is generated in the CPU and the read request is sent to the memory controller for the level one instruction cache L1I. During the program access stage 312 (PA) the level one instruction cache L1I processes the request, accesses the data in its memory and sends a fetch packet to the CPU boundary. During the program receive stage 313 (PR) the CPU registers the fetch packet.

Figure 4:
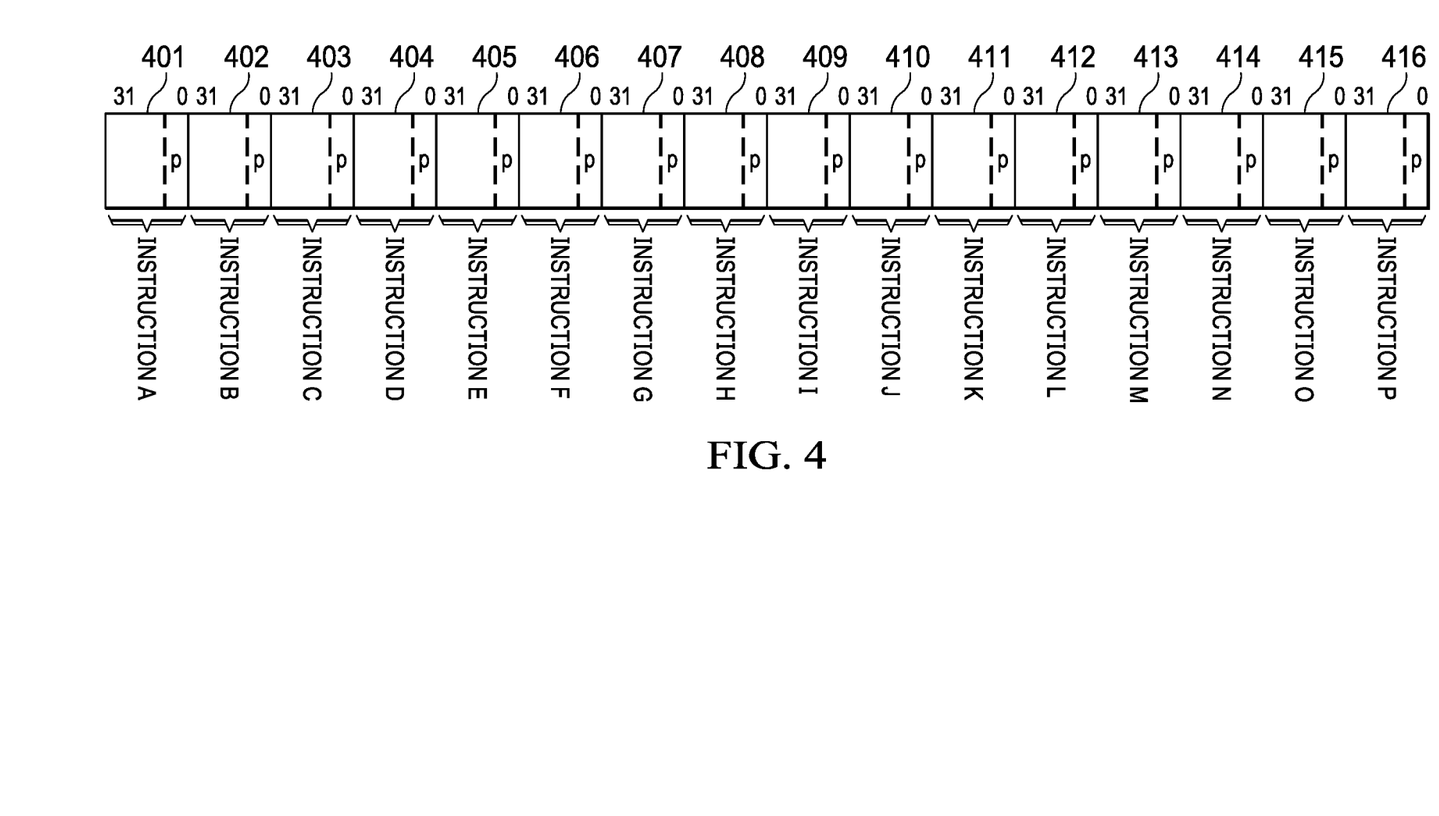
FIG. 4 is an example of a single fetch packet including multiple instructions in accordance with various examples.

In some examples, instructions are fetched as sixteen 32-bit wide slots, constituting a fetch packet, at a time. FIG. 4 illustrates 16 instructions 401 to 416 of a single fetch packet. Fetch packets are aligned on 512-bit (16-word) boundaries. An example employs a fixed 32-bit instruction length. In some examples, fixed-length instructions enable easy decoder alignment. A properly aligned instruction fetch can load plural instructions into parallel instruction decoders. Such a properly aligned instruction fetch can be achieved by predetermined instruction alignment as a result of being stored in memory (e.g., fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

CPU 110 and level one instruction cache L1I 121 pipelines are de-coupled from each other. Fetch packet returns from level one instruction cache L1I can take different numbers of clock cycles, depending on external circumstances such as whether there is a hit in level one instruction cache 121 or a hit in level two combined cache 130. Therefore program access stage 312 (PA) can take several clock cycles instead of 1 clock cycle as in the other stages.

The instructions executing in parallel constitute an execute packet. In an example, an execute packet can contain up to sixteen instructions (e.g., a fetch packet in which the p bit for each instruction is a 1). In some cases, no two instructions in an execute packet are configured to use the same functional unit. A slot is one of five types: 1) a self-contained instruction executed on one of the functional units of CPU 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 320 include instruction dispatch stage 321 (DS) (e.g., instruction dispatch to appropriate execution unit stage 321 (DS)), instruction decode stage 1 322 (DC1) (e.g., instruction pre-decode stage 322 (DC1)); and instruction decode stage 2 323 (DC2) (e.g., instruction decode, operand reads stage 323 (DC2)). During instruction dispatch to appropriate execution unit stage 321 (DS), the fetch packets are split into execute packets and assigned to the appropriate functional units. During the instruction pre-decode stage 322 (DC1), the source registers, destination registers and associated paths are decoded for the execution of the instructions in the functional units. During the instruction decode, operand reads stage 323 (DC2), more detailed unit decodes are done, as well as reading operands from the register files.

Execution phases 330 include execution stages 331 to 335 (E1 to E5). Different types of instructions require different numbers of these stages to complete their execution. These stages of the pipeline play an important role in understanding the device state at CPU cycle boundaries.

During execute 1 stage 331 (E1) the conditions for the instructions are evaluated and operands are operated on. As illustrated in FIG. 3, execute 1 stage 331 may receive operands from a stream buffer 341 and one of the register files shown schematically as 342. For load and store instructions, address generation is performed and address modifications are written to a destination register file. For branch instructions, branch fetch packet in PG phase is affected. As illustrated in FIG. 3, load and store instructions access memory here shown schematically as data memory access 351 (e.g., memory 351). For single-cycle instructions, the pipeline controller facilitates writing results of such single-cycle instructions to a holding register, which is described in further detail below. Additionally, as described further below, an event controller (e.g., event controller 119) is configured to detect whether an event is present in an execute packet in E1 331. Events that are detectable in E1 331 include exceptions, such as L1I 121 page faults, an error in L1I 121 return data status, an unrecognized instruction format, an illegal opcode, an illegal resource access, a privilege error, an execution exception, and/or an address exception. Writing results of single-cycle instructions to the holding register assumes that any conditions for such instructions are evaluated as true. If a condition is evaluated as false, any single-cycle instructions do not write any results or have any pipeline operation after execute 1 stage 331.

During execute 2 stage 332 (E2) load instructions may send the address to memory. Store instructions may send the address and data to memory. Single-cycle instructions that saturate results set the SAT bit in the control status register (CSR) or flag status register if saturation occurs. For 2-cycle instructions, the pipeline controller also facilitates writing results of such 2-cycle instructions to the holding register. In some examples, an execute packet is frozen in E2 332 (and results in the holding register are maintained) while any pending stalls are addressed. Stalls may arise, for example, in response to an instruction of an execute packet that misses a translation lookaside buffer (TLB), and thus requires further address translation. Upon any outstanding stalls being resolved and the pipeline controller not detecting additional events associated with the execute packet in E2 332, the pipeline controller is configured to allow the execute packet to proceed through the remainder of the execute phase 330. At this time, any results of single-cycle or 2-cycle instructions in the holding registers are committed (e.g., written back to a destination register file).

During execute 3 stage 333 (E3) data memory accesses are performed. Any multiply instructions that saturate results set the SAT bit in the control status register (CSR) or flag status register if saturation occurs. For 3-cycle instructions, results are written to a destination register file.

During execute 4 stage 334 (E4) load instructions bring data to the CPU boundary. For 4-cycle instructions, results are written to a destination register file.

During execute 5 stage 335 (E5) load instructions write data into a register. This is illustrated schematically in FIG. 3 with input from memory 351 to execute 5 stage 335.

As explained above, certain instructions complete in relatively few execute stages (e.g., single-cycle or 2-cycle instructions), while other instructions take a greater number of execute stages to complete. In some cases, an exception or event is generated in response to execution of an instruction. However, the exception or event is generated in an execute stage after which another instruction has already completed and thus had its result committed (e.g., written to a destination register file, such as one of the register files described with respect to FIG. 2). In these cases, the task cannot be recovered to the execute packet that generated the exception or event, because of the possibility that certain instructions of that execute packet have already been committed. In these cases, the task is restarted or ended because it cannot be recovered to the execute packet that generated the exception or event.

Examples of this disclosure address the foregoing by providing a holding register (e.g., in the execute phase 330 of the pipeline) to hold results of instructions that complete prior to an execute stage in the pipeline in which an event may be detected. In many instances, a set of instructions in an execute packet will be executed as they pass through the execute stages of the pipeline and will do so uninterrupted. Instructions that complete in the earlier stages may have results of their execution stored in the holding register until all of the instructions in the execute packet complete. At that time, the results of all the instructions are committed to memory so that the execute packet completes in an all-or-nothing manner.

However as described above, because events and other interruptions may occur during the execution of the instructions in the execute packet, the holding register provides temporary storage that avoids early commit of the results of any early completing instructions to preserve this all-or-nothing behavior. For ease of explanation, in some of the following examples, it is assumed that events associated with an execute packet are detected, if at all, during E2 332. Thus, if an event associated with an execute packet is not detected by E2 332, the pipeline controller is configured to allow the execute packet to continue in the execution phase 330 and the instructions with results in the holding registers are committed (e.g., the results are written back to a destination register file). In other examples, events associated with an execute packet may be detected later in the execution phase 330. In such examples, the instructions with results in the holding registers are not committed (e.g., the results are maintained in the holding registers) until after the point in the execution phase 330 in which events associated with the execute packet can be detected.

Reverting back to the assumption that events associated with an execute packet are detected, if at all, during E2 332, responsive to an event or exception being detected during E2 332 or earlier, the pipeline controller is configured to flush the execute packet (including any results from instructions that are in the holding register) from E2 332. At this point, no instructions of the execute packet have been committed because the results from single-cycle and 2-cycle instructions have also been flushed from the holding registers. Subsequently, a context switch is performed by the event controller 119, in which the current machine status and the interrupted task context is saved and the event controller 119 switches to an interrupt service routine (ISR) that handles the event or exception. The ISR is configured to indicate (e.g., to the event controller 119) the completion of handling the event or exception and that no new event has occurred, which causes the event controller 119 to return to its previous context, or perform a context restore back to the task being executed. Because none of the instructions of the flushed execute packet were committed, execution of the task is able to resume on the execute packet that was flushed from the pipeline prior to handling the event.

Figure 5:
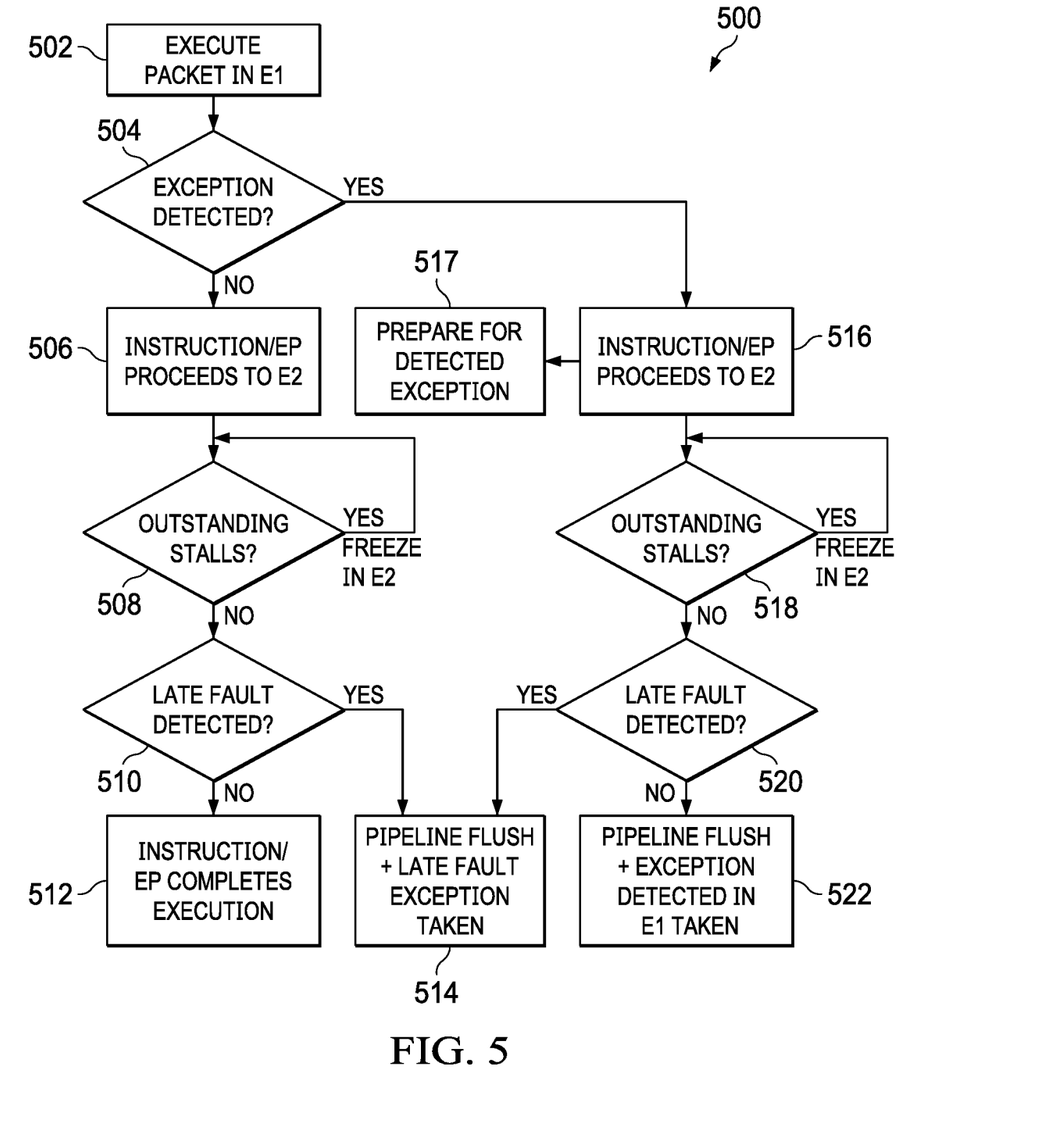
FIG. 5 is a flowchart of a method for freezing a pipeline to facilitate handling an event in accordance with various examples.

FIG. 5 is a flow chart of a method 500 for event handling in execute stages (e.g., execution phase 330) of a pipeline in accordance with various examples. In particular, the method 500 includes freezing the pipeline to facilitate handling an event in accordance with various examples.

The method 500 begins in block 502 with receiving an execute packet in a first execute stage (e.g., E1 331) of a pipeline. As described above, the execute packet contains a plurality of instructions, some of which may include a single-cycle instruction that generates a result in E1 331. The method 500 continues in block 504 in which the event controller 119 determines whether an event is present (e.g., detected) in the execute packet in E1 331. Events detected by the event controller 119 while the execute packet is in E1 331 include L1I 121 page faults, an unrecognized instruction format, an illegal opcode, an illegal resource access, a privilege error, an execution exception, and/or an address exception.

If the event controller 119 does not detect an event in the execute packet in E1 331, the method 500 continues to block 506, in which the pipeline controller forwards the execute packet to a second execute stage (e.g., E2 332) of the pipeline. As described above, the execution phase 330 of the pipeline includes one or more holding registers that are configured to store the results of certain instructions without committing those instructions (e.g., allowing the results to be written back to a destination register file). For example, the holding registers are configured to store the results of single-cycle instructions that complete in E1 331 and 2-cycle instructions that complete in E2 332.

The method 500 then continues to block 508, in which the pipeline controller determines whether any pending stalls exist. Stalls may arise, for example, in response to an instruction of an execute packet that misses a TLB, and thus requires further address translation. The method 500 remains in block 508 while any pending stalls are addressed, and thus the execute packet is frozen in E2 332 (and results in the holding registers are maintained). Upon any outstanding stalls being resolved, the method 500 continues to block 510 in which the pipeline controller determines whether a late fault associated with the execute packet in E2 332 (e.g., an event not previously detected by the event controller 119) is detected. One example of such a late fault is a page fault that arises in response to a TLB miss. Other examples of the late fault include streaming engine 125 errors, write conflicts, divide-by-zero errors, errors in L1D 123 return data status, and matrix multiplication errors.

If no late fault is detected by the pipeline controller in block 510, the method 500 continues to block 512 in which the pipeline controller allows the execute packet to proceed through the remainder of the execute phase 330. At this time, any results of single-cycle or 2-cycle instructions in the holding registers are also committed (e.g., written back to a destination register file) to complete execution of the execute packet.

However, if a late fault is detected by the pipeline controller in block 510, the method 500 continues to block 514 in which the pipeline controller is configured to flush the execute packet (including any results from instructions that are in the holding register) from the pipeline. At this point, no instructions of the execute packet have been committed because the results from instructions completing prior to the late fault detection in block 510 have also been flushed from the holding registers. Subsequently, a context switch to the event controller 119 is performed and the event controller is configured to handle the late fault event or exception. Although not shown in FIG. 5, upon the event or exception being handled by the event controller 119, another context switch back to the task may be performed if no new event occurs. Because none of the instructions of the flushed execute packet were committed, execution of the task is able to resume on the execute packet that was flushed from the pipeline prior to handling the event.

Referring back to block 504, if the event controller 119 detects an event in the execute packet in E1 331, the method 500 continues to block 516, in which the pipeline controller again forwards the execute packet to E2 332 of the pipeline. As described above, the execution phase 330 of the pipeline includes one or more holding registers that are configured to store the results of certain instructions without committing those instructions (e.g., allowing the results to be written back to a destination register file). For example, the holding registers are configured to store the results of single-cycle instructions that complete in E1 331 and 2-cycle instructions that complete in E2 332.

Because the event controller 119 detects an event in the execute packet in block 504, the method 500 also includes the event controller 119 preparing for the detected exception in block 517. For example, the event controller 119 prepares various internal exception reporting registers (e.g., address of the detected event, status, and the like), prepares to fetch a service routine to handle the detected event, collects control register data to be saved during a context switch from processing the task to handling the detected event, and the like. At this time, however, the event controller 119 does not actually handle the event detected in block 504.

The method 500 then continues to block 518, in which the pipeline controller determines whether any pending stalls exist. As above, stalls may arise in response to an instruction of an execute packet that misses a TLB, and thus requires further address translation. The method 500 remains in block 518 while any pending stalls are addressed, and thus the execute packet is frozen in E2 332 (and results in the holding registers are maintained). Upon any outstanding stalls being resolved, the method 500 continues to block 520 in which the pipeline controller determines whether a late fault associated with the execute packet in E2 332 is detected.

If no late fault is detected by the pipeline controller in block 520, the method 500 continues to block 522 in which the pipeline controller is configured to flush the execute packet (including any results from instructions that are in the holding register) from the pipeline. At this point, no instructions of the execute packet have been committed because the results from instructions completing prior to the late fault detection in block 520 have also been flushed from the holding registers. Subsequently, a context switch to the event controller 119 is performed and the event controller is configured to handle the event or exception detected in the execute packet in E1 331 (e.g., in block 504). Although not shown in FIG. 5, upon the event or exception detected in E1 331 being handled by the event controller 119, another context switch back to the task may be performed if no new event occurs. Because none of the instructions of the flushed execute packet were committed, execution of the task is able to resume on the execute packet that was flushed from the pipeline prior to handling the event.

However, if a late fault is detected by the pipeline controller in block 520, the method 500 continues again to block 514 in which the pipeline controller is configured to flush the execute packet (including any results from instructions that are in the holding register) from the pipeline, and the event controller 119 handles the late fault event or exception. Although not shown in FIG. 5, upon the event or exception being handled by the event controller 119, another context switch back to the task may be performed. Because none of the instructions of the flushed execute packet were committed, execution of the task is able to resume on the execute packet that was flushed from the pipeline prior to handling the event. Priority is thus given to the late fault being handled, and when the task resumes on the execute packet that was flushed from the pipeline prior to handling the late fault, the event or exception detected in the execute packet in E1 331 (e.g., in block 504) may be handled.

Figure 6A:
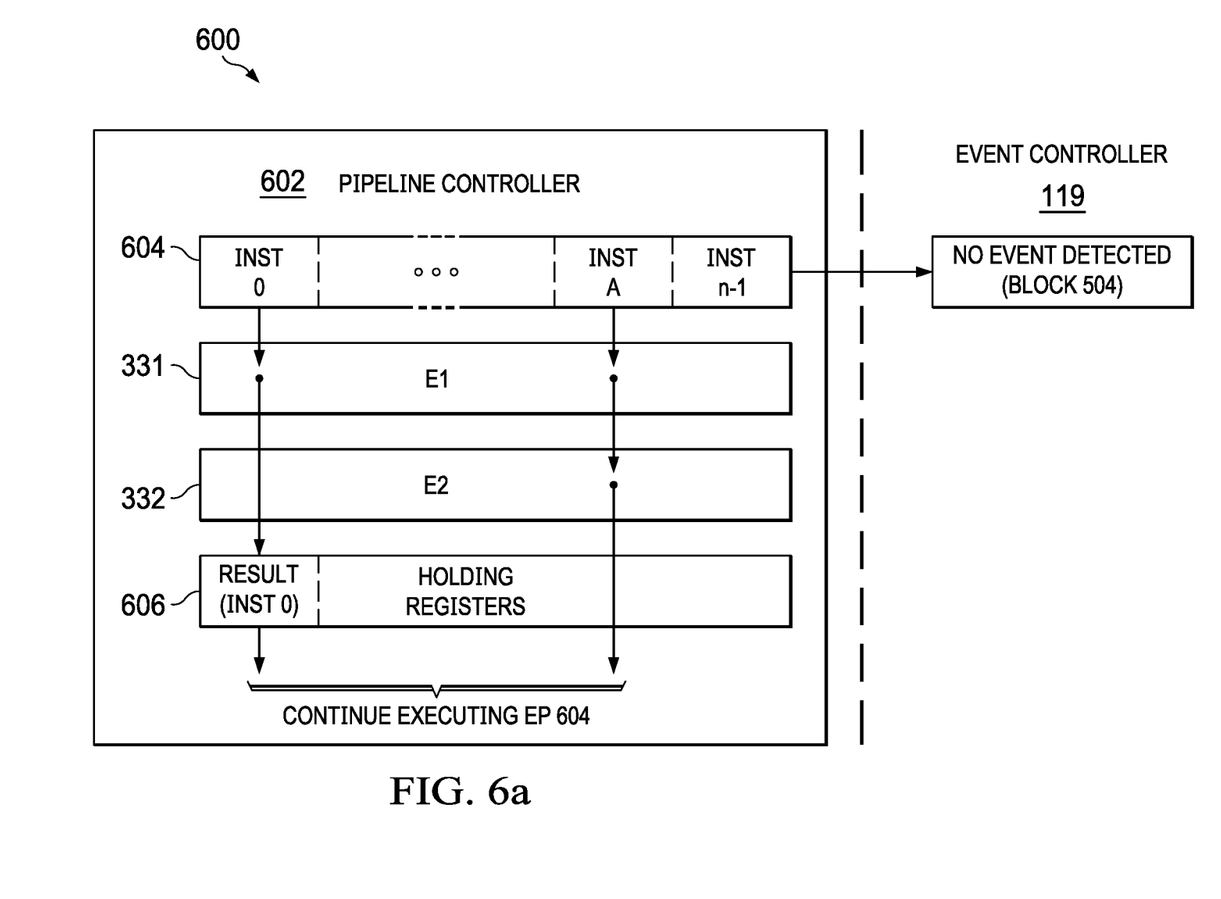
FIGS. 6a-6c are schematic diagrams of an execute portion of a pipeline including holding registers in accordance with various examples.
Figure 6B:
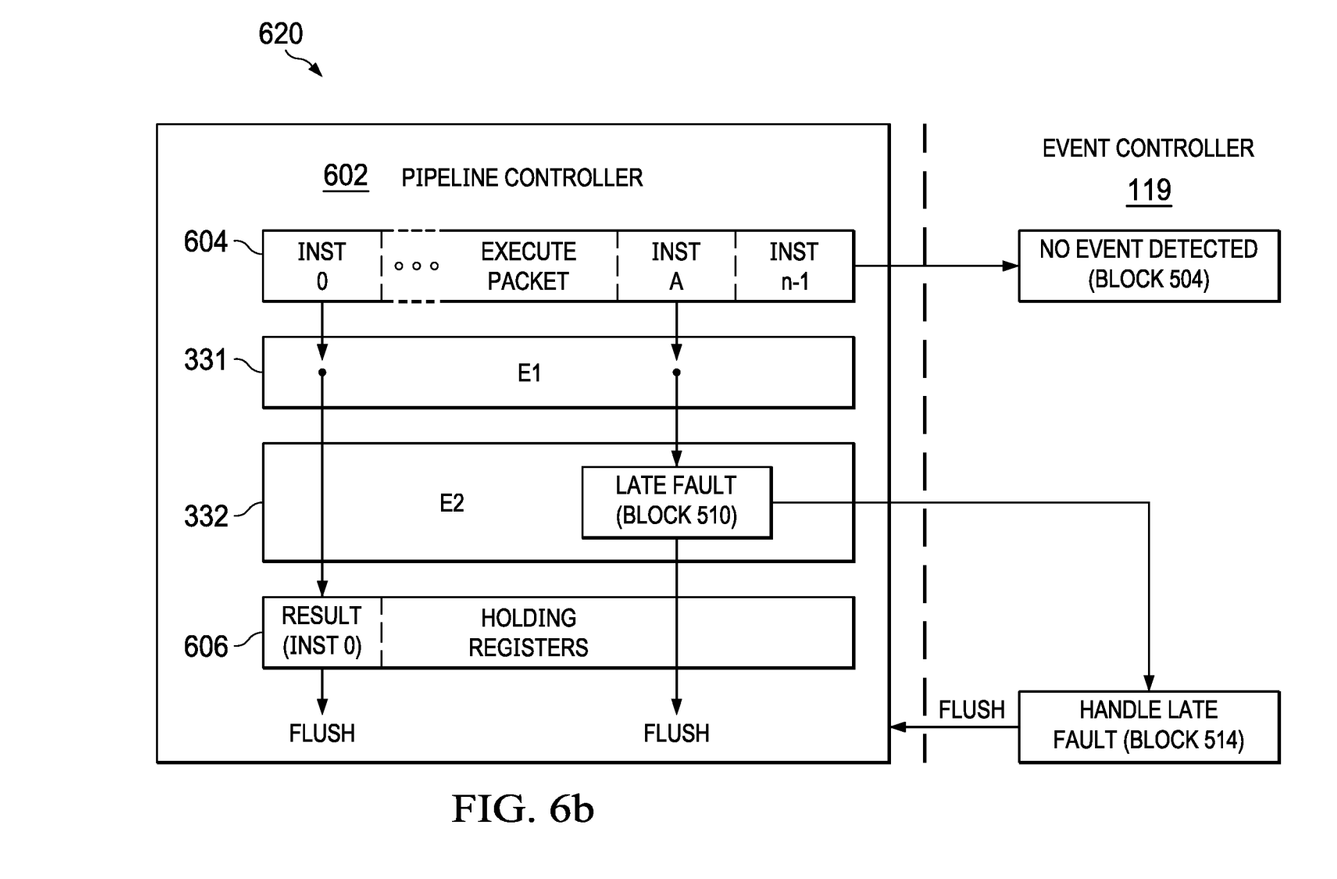
Figure 6C:
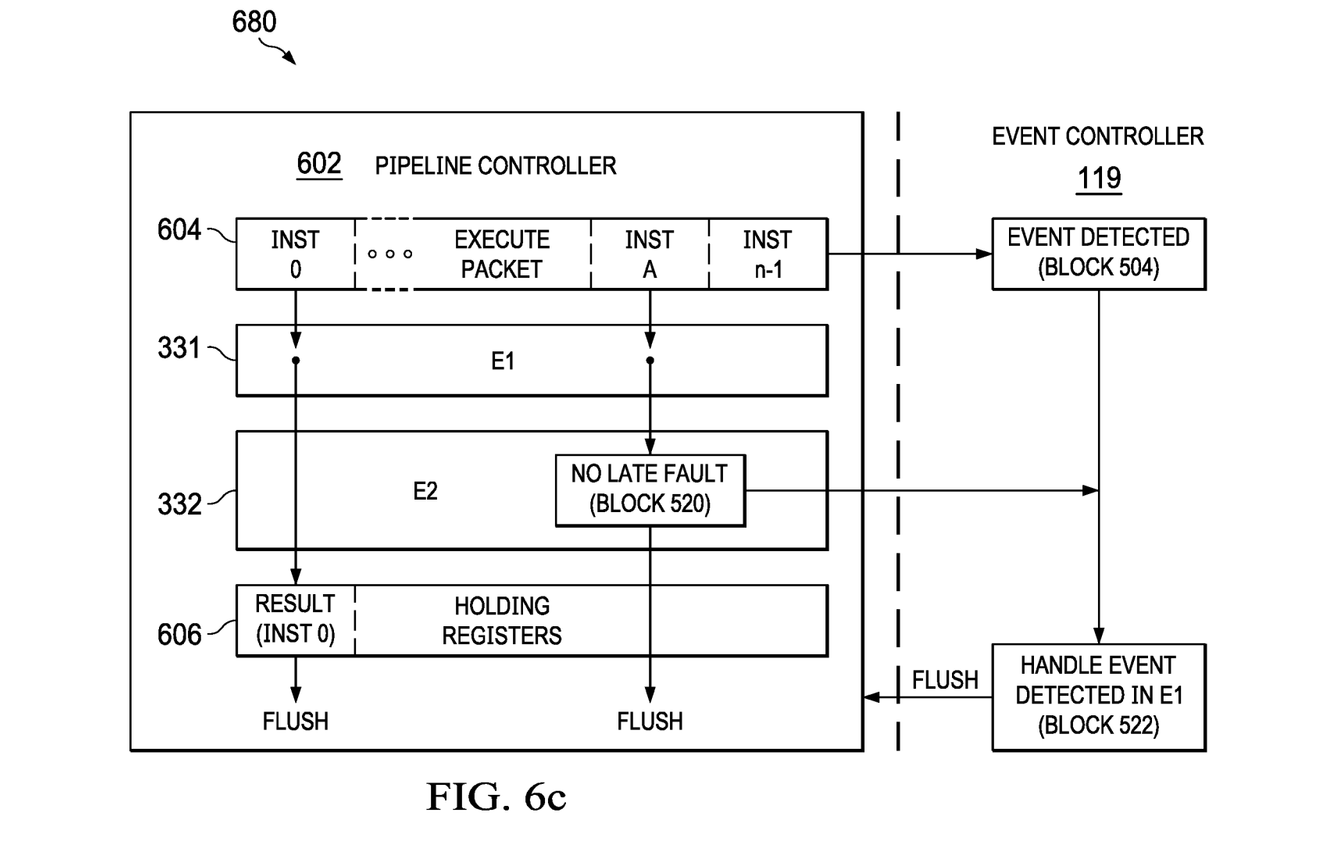

FIGS. 6a-6c are schematic diagrams of a portion of the execute phase 330 of the pipeline including holding registers in accordance with various examples. A pipeline controller 602 performs the functionality described above, for example with respect to FIG. 5. An exemplary execute packet 604 includes 'N' instructions, where instruction 0 (INST 0) is a single-cycle instruction (e.g., is complete following E1 331). Holding registers 606 hold results of instructions that complete prior to an execute stage in the pipeline in which an event may be detected, such as exemplary INST 0, as described above.

FIG. 6a demonstrates an example 600 of a portion of the method 500 that culminates in block 512, with continuing execution of the execute packet 604. In particular, the execute packet 604 is provided to the first stage of the execute phase of the pipeline (e.g., E1 331). Because INST 0 is a single-cycle instruction, the result of INST 0 is provided to the holding registers 606. In the example 600, the execute packet 604 also includes INST A, which is an instruction that does not complete in either E1 331 or E2 332. Thus, upon reaching block 512 in which the execute packet 604 completes execution, the INST 0 result from the holding register 606 and INST A as it proceeds from E2 332 are provided to the remainder of the execute phase 330. In an example, the INST 0 result from the holding register 606 is written to a destination register file at this time, thus committing INST 0. The event controller 119 is not implicated in the example 600 because no event was detected in either of blocks 504 or 510.

FIG. 6b demonstrates an example 620 of a portion of the method 500 that culminates in block 514 with handling a late fault, in which the event controller 119 does not detect an event in block 504. As above, the execute packet 604 is provided to the first stage of the execute phase of the pipeline (e.g., E1 331). Because INST 0 is a single-cycle instruction, the result of INST 0 is provided to the holding registers 606. In the example 620, the execute packet 604 also includes INST A, which is an instruction that does not complete in either E1 331 or E2 332. In this example 620, a late fault is detected (e.g., as in block 510) by the pipeline controller 602 in E2 332. The late fault is communicated to the event controller 119, which handles the late fault as in block 514. Additionally, the event controller 119 may signal to the pipeline controller 602 that the event controller 119 is handling the late fault, which causes the pipeline controller 602 to flush the execute packet 604 (including the results in the holding register 606) from the pipeline.

Finally, FIG. 6c demonstrates an example 680 of a portion of the method 500 that culminates in block 522 with handling the event detected in the execute packet. As above, the execute packet 604 is provided to the first stage of the execute phase of the pipeline (e.g., E1 331). Because INST 0 is a single-cycle instruction, the result of INST 0 is provided to the holding registers 606. In the example 680, the execute packet 604 also includes INST A, which is an instruction that does not complete in either E1 331 or E2 332. In this example 680, the event controller 119 detects an event in the execute packet 604 (e.g., in block 504). Additionally, in example 680, no late fault is detected by the pipeline controller 602, and thus the event controller 119 handles the event detected in block 504. Additionally, the event controller 119 may signal to the pipeline controller 602 that the event controller 119 is handling the event detected in block 504, which causes the pipeline controller 602 to flush the execute packet 604 (including the results in the holding register 606) from the pipeline. Although not specifically depicted, the example portion of the method 500 that culminates in block 514 with handling a late fault, in which the event controller 119 detects an event in block 504, is treated as shown in FIG. 6b with handling the late fault taking precedence. Subsequently (e.g., upon returning to the flushed execute packet 604 of the task), the event controller 114 may handle the event detected in block 504.

In the foregoing discussion and in the claims, the terms "including" and "comprising" are used in an open-ended fashion, and thus mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is illustrative of the principles and various embodiments of the present disclosure. Numerous variations and modifications will become apparent to those skilled in the art once the above disclosure is fully appreciated. The following claims should be interpreted to embrace all such variations and modifications.

The invention claimed is:

1. A method, comprising:
receiving an execute packet of a task in a first execute stage of a pipeline (E1), wherein the execute packet includes a first instruction that generates a result in E1, and includes a second instruction;
determining, by an event controller, that a first event is present responsive to executing the execute packet in E1;
forwarding, by a pipeline controller, the execute packet to a second stage of the pipeline (E2) and storing the result of the first instruction in a holding register;
determining, by the pipeline controller, whether a second event that interrupts execution of the execute packet occurs prior to completion of executing the second instruction;
flushing the execute packet from E2 and flushing the result of the first instruction from the holding register;
handling, by the event controller, the second event responsive to the second event occurring; and
handling, by the event controller, the first event responsive to the second event not occurring prior to completion of executing the second instruction.

2. The method of claim 1, further comprising, based on the second event occurring prior to completion of executing the second instruction, flushing the result of the first instruction from the holding register without committing the result.

3. The method of claim 2, further comprising, returning to process the task by again executing the first instruction and the second instruction of the execute packet.

4. The method of claim 2, wherein the second event is associated with execution of the second instruction.

5. The method of claim 1, further comprising, responsive to a stall condition being present in the pipeline, freezing the second instruction of the execute packet and continuing to store the result of the first instruction in the holding register, wherein determining whether the second event occurs prior to completion of executing the second instruction is responsive to the stall condition clearing or no stall condition being present in the pipeline.

6. The method of claim 1, wherein the first instruction and the second instruction of the execute packet are executed in parallel.

7. A method, comprising:
receiving an execute packet of a task in a first execute stage of a pipeline (E1), wherein the execute packet comprises a first instruction that generates a result in E1, and includes a second instruction;
determining, by an event controller, that a first event is present responsive to executing the execute packet in E1;
forwarding, by a pipeline controller, the execute packet to a second execute stage of the pipeline (E2) and storing the result of the first instruction in a holding register;
responsive to a stall condition being present in E2, freezing the execute packet in E2 and continuing to store the result of the first instruction in the holding register;
responsive to the stall condition clearing or no stall condition being present in E2, determining, by the pipeline controller, whether a second event associated with the execute packet in E2 is detected;
flushing the execute packet from E2 and flushing the result of the first instruction from the holding register;
handling, by the event controller, the second event responsive to the second event being detected; and
handling, by the event controller, the first event responsive to the second event not being detected.

8. The method of claim 7, further comprising, after handling the detected second event, returning to process the task by again providing the previously-flushed execute packet to E1.

9. The method of claim 7, further comprising, after handling the second event:
returning to process the task again by providing the previously-flushed execute packet to E1; and
handling, by the event controller, the first event.

10. The method of claim 7, wherein storing the result of the first instruction in the holding register comprises not writing back the result of the first instruction to a register file or a memory.

11. A data processor, comprising:
a pipeline including a first execute stage (E1), a second execute stage (E2), and a holding register, the pipeline configured to receive an execute packet of a task in E1, wherein the execute packet comprises a first instruction that generates a result in E1, and comprises a second instruction;
an event controller coupled to the pipeline, the event controller configured to determine that a first event is present in-responsive to executing the execute packet in E1; and
a pipeline controller coupled to the event controller and the pipeline, the pipeline controller configured to:
forward the execute packet to E2 and store the result of the first instruction in the holding register;
responsive to a stall condition being present in E2, freeze the execute packet in E2 and continue to store the result of the first instruction in the holding register;
responsive to the stall condition clearing or no stall condition being present in E2, determine whether a second event associated with the execute packet in E2 is detected; and
flush the execute packet from E2 and flush the result of the first instruction from the holding register; and
wherein the event controller is further configured to:
handle the second event responsive to the second event being detected; and
handle the first event responsive to the second event not being detected.

12. The data processor of claim 11, wherein, after the second event is handled, the previously-flushed execute packet is again provided to E1 to be executed.

13. The data processor of claim 12, wherein after the previously-flushed execute packet is again provided to E1, the event controller is further configured to handle the first event.

14. The data processor of claim 11, wherein when the result of the first instruction is stored in the holding register, the result of the first instruction is not written back to a register file.

* * * * *